United States Patent
Hache et al.

(10) Patent No.: US 10,173,641 B2
(45) Date of Patent: Jan. 8, 2019

(54) METHOD FOR PROVIDING AN OPERATING SIGNAL

(71) Applicant: Huf Hülsbeck & Fürst GmbH & Co. KG, Velbert (DE)

(72) Inventors: Christof Hache, Velbert (DE); Helmut Schumacher, Coesfeld (DE); Norbert Heller, Grefrath (DE); Oliver Müller, Velbert (DE); Bernd Ette, Wolfsburg (DE); Nadine Sticherling, Essen (DE); Alexander Ziegler, Wülfrath (DE); Jean Malabo Yomkil, Essen (DE); Stefan Mönig, Schwelm (DE); Iko Lindic, Essen (DE); Mirko Schindler, Velbert (DE)

(73) Assignee: Huf Hülsbeck & Fürst GmbH & Co. KG, Velbert (DE)

( * ) Notice: Subject to any disclaimer, the term of this patent is extended or adjusted under 35 U.S.C. 154(b) by 0 days.

(21) Appl. No.: 15/115,646

(22) PCT Filed: Jan. 7, 2015

(86) PCT No.: PCT/DE2015/100010
§ 371 (c)(1),
(2) Date: Jul. 29, 2016

(87) PCT Pub. No.: WO2015/113556
PCT Pub. Date: Aug. 6, 2015

(65) Prior Publication Data
US 2017/0166168 A1 Jun. 15, 2017

(30) Foreign Application Priority Data
Jan. 31, 2014 (DE) .................. 10 2014 101 192

(51) Int. Cl.
*B60R 25/24* (2013.01)
*E05B 81/78* (2014.01)
(Continued)

(52) U.S. Cl.
CPC .............. *B60R 25/24* (2013.01); *B60R 11/04* (2013.01); *E05B 81/77* (2013.01); *E05B 81/78* (2013.01);
(Continued)

(58) Field of Classification Search
CPC ........... G06K 9/00369; G06K 9/00791; G06K 9/209; G06T 7/20; G06T 2207/30196;
(Continued)

(56) References Cited

U.S. PATENT DOCUMENTS

2011/0235018 A1* 9/2011 Mori .................. G01C 3/08
356/5.01
2011/0276234 A1* 11/2011 Van Gastel ............. E05B 81/78
701/49
(Continued)

FOREIGN PATENT DOCUMENTS

CN 101519935 A 9/2009
CN 101784424 A 7/2010
(Continued)

OTHER PUBLICATIONS

First Office Action for Chinese application No. 201580006180.7 dated Feb. 5, 2018, and its English translation, 15 pages.

*Primary Examiner* — Benyam Haile
(74) *Attorney, Agent, or Firm* — Rudy J. Ng; Bret E. Field; Bozicevic, Field & Francis LLP

(57) ABSTRACT

The invention concerns a method (70) for preparing an operating signal for a motor vehicle (1), the method involving the following steps: (a) obtaining a signal indicating that an authorized user (10) has been authenticated; (b) moni-
(Continued)

Figure 1:
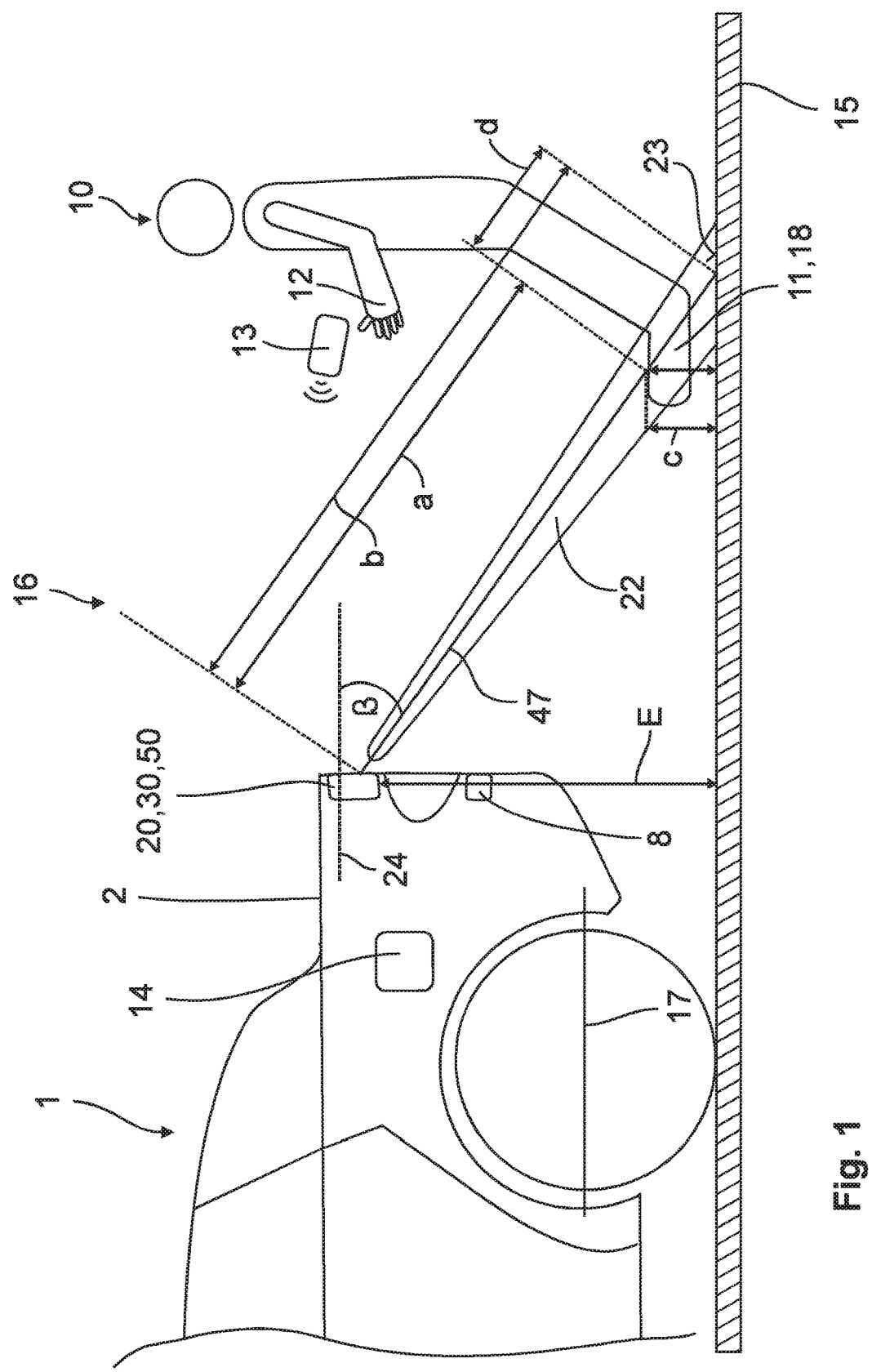

toring an actuating region (22) located outside the motor vehicle (1) by means of an optical sensor system (30); (c) measuring a distance (a) between an object (18) in the actuating region (22) and an optical sensor (50) by means of the optical sensor system (30); (d) comparing the distance (a) with a default by means of the optical sensor system (30); and (e) preparing an operating signal if the default is satisfied.

20 Claims, 10 Drawing Sheets

(51) Int. Cl.
*B60R 11/04* (2006.01)
*B60R 25/10* (2013.01)
*G06K 9/00* (2006.01)
*G06K 9/20* (2006.01)
*G01C 21/34* (2006.01)
*B60R 11/00* (2006.01)

(52) U.S. Cl.
CPC ......... *B60R 25/10* (2013.01); *B60R 2011/004* (2013.01); *G01C 21/3407* (2013.01); *G06K 9/00369* (2013.01); *G06K 9/00791* (2013.01); *G06K 9/209* (2013.01); *G06T 2207/30196* (2013.01); *G07C 2209/64* (2013.01)

(58) Field of Classification Search
CPC . G06T 2207/30252; G06T 2207/30248; B60R 2300/105; B60R 25/10; B60R 25/24; G01C 21/3407; E05B 81/77; E05B 81/78
See application file for complete search history.

(56) References Cited

U.S. PATENT DOCUMENTS

| | | | | |
|---|---|---|---|---|
| 2011/0309912 A1* | 12/2011 | Muller | ................. | B60R 25/246 340/5.72 |
| 2014/0009264 A1* | 1/2014 | Song | ..................... | G08C 19/00 340/5.64 |
| 2015/0175072 A1* | 6/2015 | Sabeti | .................... | H04N 7/183 348/148 |

FOREIGN PATENT DOCUMENTS

| | | | | |
|---|---|---|---|---|
| CN | 103527030 A | 1/2014 | | |
| DE | 102005032402 B3 * | 9/2006 | .......... | B60Q 1/0023 |
| DE | 102008021989 A1 | 12/2008 | | |
| DE | 102007050094 A1 | 4/2009 | | |
| DE | 102009023594 A1 | 12/2010 | | |
| DE | 102010056171 A1 | 6/2012 | | |
| DE | 102011115760 A1 | 4/2013 | | |
| WO | WO2013037806 A1 | 3/2013 | | |

* cited by examiner

METHOD FOR PROVIDING AN OPERATING SIGNAL

The invention relates to a method for providing an operating signal for a motor vehicle . The invention further relates to an assembly module for a motor vehicle.

DE 10 2008 021 989 A1 discloses a method for providing an operating signal for a motor vehicle, in which a visible control panel is provided. If the user touches the control panel, with a foot for example, the process for automatic opening of the vehicle door can be initiated after a vehicle door has been unlocked.

The disadvantage of this is that the user also initiates opening of the vehicle door when the user is standing entirely inside the control panel. In this case, the user can be hit and injured by the vehicle door. In the same way, opening of the vehicle door can be initiated if a cat or a dog runs through the control panel, for example and the user himself is standing directly beside the vehicle door, so that the user can be hit and injured by the vehicle door in this case too.

It is therefore the object of the present invention to provide a method and an assembly module for a motor vehicle which overcomes at least one of the aforementioned drawbacks, and in particular enables a moving part of the motor vehicle to be opened without danger to the user.

To solve this object, a method as described herein is provided. Advantageous refinements of the method are described in the dependent method claims. The object is further solved by an assembly module as described herein . Advantageous refinements of the assembly module are described in the dependent apparatus claims. In addition, protection is claimed for an authentication system with an inventive assembly module, an ID transmitter and an access control system as described herein. Features and details that are described in connection with the assembly module and/or authentication system according to the invention, also apply in connection with the inventive method and vice versa. The features mentioned in the claims and in the description can each be essential to the invention either individually or in combination. A motor vehicle with an inventive assembly module and/or with an authentication system according to the invention is also placed under protection.

According to the invention, the method comprises the steps of:
a) receiving a signal indicating that an authorised user has been authenticated,
b) monitoring an actuation region outside the motor vehicle via an optical sensor system,
c) detecting a distance between an object in the actuation region and an optical sensor via the optical sensor system,
d) comparing the distance with a specification via the optical sensor system,
e) providing an operating signal if the specification is satisfied.

In particular, step b is carried out after step a). Steps c) and d) are carried out in particular during step b). When the specification is fulfilled, particularly step b) is terminated and step e) is carried out. The comparison can be a direct comparison, in which the distance measured in step c) is compared directly with the specification, or an indirect comparison, in which a further variable is determined using the distance and this is then compared with the specification. In other words, in step d) the distance measured in step c) is correlated with a specification.

Detecting a distance between an object in the actuation region and the optical sensor and specifying that this distance must satisfy a specification, before the operating signal can be provided serves to create a condition for the provision of the operating signal so that not every object in the actuation region triggers the operating signal. For distances that do not satisfy the specification, an operating signal is not provided. Instead, the operating signal is only provided when the specification is satisfied. The condition thus ensures that the operating signal is not triggered by an action by the user in the actuation region or an unintended object, such as a dog, for which the operating signal is not to be triggered. Instead, the operating signal is only triggered by a deliberate action by the user. The deliberate action of the user can be performed in particular with a hand or foot. The fact that the operating signal is not unintentionally or unexpectedly means that the user is not surprised thereby. Rather, a user's intention is recognised. Thus, the hazard of an operation triggered by the operating signal, e.g., opening of a moving part of the motor vehicle, is less hazardous for the user.

The operating signal can be a signal to unlock and/or lock and/or open and/or close a moving part of the motor vehicle. The moving part can particularly be a tailgate and/or a side door of the motor vehicle. The tailgate and/or the side door can be designed as a sliding door. The operating signal can serve to unlock the moving part, for example. The spring effect of a seal can then serve to move the moving part partly from a closed position, so that it is partly open. In addition or alternatively thereto, the operating signal can be a signal for activating a motorised opening and/or closing aid. In this context, the motor vehicle has a motor that opens and/or closes the moving part fully.

In addition or alternatively thereto, the operating signal can be a signal for retracting and/or extending a trailer hitch. In particular several different user intentions can be determined such as the user intention to open a moving part, and the user intention to extend the towing hitch.

It is conceivable that the actuation region ends on a ground surface, on which the motor vehicle is standing. The operating section has a limit area on the ground surface. In this case, the actuation region can extend substantially orthogonally to the ground surface or comprise an inclination angle to a plane which extends parallel to a plane connecting the vehicle axles. This angle of inclination particularly corresponds to the inclination angle of the optical sensor.

In particular, the actuation region has a truncated frusto-conical range with a circular or elliptical base. The frusto-conical range can in particular correspond to a sloping truncated cone.

The specification preferably corresponds to a minimum distance condition of the distance between the object and the optical sensor. The operating signal is thus only provided if the object does not come too close to the optical sensor. This ensures that the user is far enough away from the optical sensor. Since the optical sensor can be installed close to the moving part, this makes it possible for the user to be located at a sufficient distance from the moving part. Thus, the user's safety can be further increased.

The minimum distance condition can be stored in the optical sensor system as a fixed value. Alternatively, the minimum distance condition can be stored as a variable. Thus, minimum distance condition can be dependent on a ground surface on which the motor vehicle is standing, for example. The minimum distance condition cancan be stored in a monitoring unit of the optical sensor system.

In particular, the specification, particularly the minimum distance condition, can correspond to a fixed, predetermined minimum distance between the object and the optical sensor which is also stored in the optical sensor system. The operating signal is only provided if the distance from the object to the optical sensor exceeds the minimum distance. An absolute value for the minimum distance from the object to the optical sensor can be stored in the optical sensor system, particularly in the monitoring unit. The distance of the object from the optical sensor is detected during monitoring of the actuation region. The specification is only satisfied when the detected distance is greater than the minimum distance. The minimum distance can vary according to the installation height at which the optical sensor is installed in the vehicle. The minimum distance can also be varied according to the inclination angle of the optical sensor. Thus, the minimum distance can be selected to be larger, by increasing the installation height and/or reducing angle of inclination. The choice of a fixed minimum distance from the optical sensor has the advantage that a direct limit value for the variable measured in step c) is selected as the specification, thereby placing less burden on the computing power of the optical sensor system. Moreover, no further variables need to be measured when the fixed minimum distance is selected as the specification.

It is also conceivable that the specification, particularly the minimum distance condition, corresponds to a minimum value for a ratio of the distance between the object and the optical sensor to a distance from a limit area of the actuation region to the optical sensor. The operating signal is only provided when the minimum value for the ratio is exceeded by a corresponding distance of the object to the optical sensor. An absolute value for the minimum ratio value can be stored in the optical sensor system, particularly in the monitoring unit. The distance of the limit area of the actuation region from the optical sensor can be stored in the optical sensor system as a fixed value, or preferably measured by the optical sensor system during monitoring. The distance of the object from the optical sensor is detected during monitoring of the actuation region. The ratio of the distance of the object from the optical sensor to the distance of the actuation region limit area from the optical sensor is made. The specification is only satisfied if the ratio is greater than the minimum value. The minimum value can be varied via the installation height and inclination angle of the optical sensor. In particular, the minimum value can be increased by raising the installation height and reducing the inclination angle.

If the minimum value is selected as the specification, a variable actuation region can advantageously be considered for purposes of the specification. If the actuation region ends on the ground surface, the specification can correspond to the minimum value for a ratio between the distance from the object to the optical sensor and a distance from the ground surface in the actuation region to the optical sensor. If the ground surface is uneven, this arrangement makes it possible to consider to take the bumpy ground surface into account as well for satisfying the specification.

As a further option, it can be provided that the specification, particularly the minimum distance condition, corresponds to a fixed, predetermined maximum distance of a surface of the object facing the optical sensor from a limit area of the actuation region, particularly located on a ground surface, which value is also stored in the optical sensor system. The operating signal is only provided if the distance of the object surface facing the optical sensor from a limit area of the actuation region, particularly on the ground surface, falls below the minimum distance. An absolute value for the maximum distance can be stored in the optical sensor system, particularly in the monitoring unit. The distance from the limit area of the actuation region to the optical sensor can be stored in the optical sensor system as a fixed value, or preferably measured by the optical sensor system during monitoring. The distance of the object from the optical sensor is measured during monitoring of the actuation region. The distance of the object surface facing the optical sensor from a limit area of the actuation region, particularly the ground surface, is determined from the distance between the limit area of the actuation region and the optical sensor and the distance between the object and the optical sensor. The specification is only satisfied if the distance determined in this way is smaller than the maximum distance. In this way, a further option is created for taking a variable length of the actuation region into account, particularly in the case of an uneven ground surface.

A distance c orthogonal to the ground surface between the object surface facing the optical sensor and the limit area can be determined using an angle of incidence with the ground surface and the distances from the object to the optical sensor and from the limit area to the optical sensor. It is conceivable that the operating signal is only provided when distance c is less than a maximum distance. The maximum distance can be predetermined in the optical sensor system. On a flat ground surface, the angle of incidence corresponds to the inclination angle. It is conceivable to use the angle of inclination instead of the angle of incidence for the sake of simplicity.

Particularly when the actuation region ends at the ground surface, the minimum distance condition can be designed such that distance c can correspond to a maximum distance for the purpose of satisfying the specification. Normally, it can be provided that the user must step on the ground surface within the actuation region a foot in order to satisfy the requirement. However, in order to make allowance for a puddle or muddy patch on the ground surface of the actuation region, it can also be provided that the user can keep his foot slightly above the ground surface to meet the requirement. Thus in particular, the maximum distance $c_{max}$ for distance c can be selected with $0 \leq c_{max} \leq 30$ cm, preferably $0 \leq c_{max} \leq 20$ cm, particularly preferably $0 \leq c_{max} \leq 10$ cm. Even if a different minimum distance condition is selected, it can be set such that the stated conditions are true for $c_{max}$.

The various options for a minimum distance requirement can be used together in any combination. Thus, a fixed predetermined minimum distance, a minimum value for the ratio, a fixed predetermined maximum distance and/or a fixed predetermined maximum distance can be provided.

The distances determined can particularly be distances averaged over the entire object and/or over the entire limit area. Alternatively, they can be single points on the object and/or in the limit area. In particular, for example, the distance of the object from the optical sensor and the distance from the limit area to the optical sensor which lie on a straight line can be correlated to each other.

In particular, the optical sensor system can determine that an object is in the actuation region on the basis of a change in the intensity of received light.

In order to be able to measure a distance between the object and the optical sensor, a time of flight measurement can be performed for example. In this, for example, one or more light pulses are emitted by the optical sensor system, particularly by a light module of the optical sensor system, and the time required for the light pulse to travel to the object and return to the optical sensor is measured. The time is directly proportional to the distance from the object. It can be that multiple light pulses are emitted successively by the optical sensor system, particularly by the light module, to be able to create an image. The light pulses can be processed integratively or cumulatively to produce the image. In order to be able to perform a distance measurement in this case, a certain time interval is specified for capturing the image in the optical sensor system. The total intensity of the optical pulses received in the light sensor in the time interval is correlated with the distance.

In order to increase measuring accuracy, it can be provided that an image is only generated with the light that was emitted by the optical sensor system, particularly by the light module. Thus, it can be that recognition images and comparison images are captured and optionally evaluated. Recognition images are formed using the reflection of the light emitted by the light module. Comparison images are created solely using interference light. Interference light can be for example sunlight or light from an artificial light source such as a garage light. The light module does not emit light to create the comparison images. The monitoring unit can detect interference light by comparing a recognition image with a comparison image. This enables the optical sensor system, particularly the monitoring unit, to generate a modified recognition image, from which the interference light is removed. It can be provided that a comparison image is captured each time after a predetermined number of recognition images.

It can be that further measures are implemented to ensure that the user can open the vehicle safely.

Thus it is conceivable that the actuation region is only monitored for a predetermined actuating time $t_B$. A maximum length of actuating time $t_B$ can be specified and stored in the optical sensor system. Distances of objects that are located in the actuation region outside the actuating time $t_B$ are not recognised. Accordingly, an operating signal cannot be triggered outside of actuating time $t_B$. The actuating time means that the operating signal can only be triggered within a limited time period, so the risk of false triggering events is reduced. Actuating time $t_B$ can particularly be set short. For example $t_B$ can be selected with the statement $3 s \leq t_B \leq 30$ s, preferably $5 s \leq t_B \leq 15$ s. Actuating time $t_B$ can particularly be started by receipt of the signal indicated that an authorized user has been authenticated, and/or it can begin immediately after receipt of said signal. The actuating time can end after the maximum length has elapsed, or earlier, e.g., by providing the operating signal or by satisfying the requirement(s). It can be provided that the beginning and end of actuating time $t_B$ are perceptible by the user.

Preferably, the operating signal can only be provided when at least one further requirement is satisfied. This also serves to further increase user safety.

Thus, the size of the object can be determined in addition to step b) during monitoring. The operating signal can only be provided when the size exceeds a minimum size and/or falls below a maximum size.

Alternatively or additionally, a defined movement of the object in the actuation region can be specified. The operating signal is only provided if the defined movement sequence takes place. The defined sequence of movements can be a predefined gesture, for example. It can be that multiple measurements of the distance of the object from the optical sensor are made in order to recognise the movement sequence in the actuation region. In this context, particularly the distance is captured in at least two successive images, particularly recognition images. The distance can be detected with a time of flight measurement.

It is conceivable that the residence time for which the object remains in the actuation region is detected during monitoring. The operating signal can only be provided if this time is longer than a minimum residence duration and/or shorter than a maximum residence duration.

It is also possible that the object must be removed from the actuation region within a predetermined removal time $t_E$ in order for the operating signal to be provided. Thus, it can be provided that removal time $t_E$ begins if the specification is satisfied as a result of step d). The beginning of removal time $t_E$ is perceptible to the user. The operating signal is only provided if the object, particularly a user's limb, is removed from the actuation region within removal time $t_E$.

It is also conceivable that a second actuation region is present. The second actuation region can also be monitored by the optical sensor system. Thus, it is conceivable that an object must remain in the second actuation region, and particularly that one of the aforementioned specifications must be satisfied in the second actuation region before the operating signal is provided.

Additionally or alternatively, a minimum distance and/or a specific position of the authorized user relative to the optical sensor and/or the motor vehicle can be necessary before the operating signal is provided. Regarding the position, it can be determined for example whether the user is in front of, beside or behind the vehicle. In particular, the minimum distance and/or the position can be determined at any time during or after authentication. In particular, the minimum distance and/or the position can be determined even after the end of the actuation period. The distance of the authorised user from the motor vehicle and/or from the optical sensor and/or the authorised user's position is detected. Here, the distance of the user from the motor vehicle and/or a position of the user, can be determined on the basis of the strength of a signal transmitted by an ID transmitter for example. The Receive Signal Strength Indicator (RSSI) can be used for this purpose, for example. By determining the strength of the transmitted signal, it can be ensured that only the authorised user has entered the detection region and indicated his actuation intention in the actuation area. It is conceivable to poll the RSSI cyclically. Alternatively, the distance of the user from the optical sensor can be determined by the optical sensor system. In this case, a detection region, which extends farther from the motor vehicle than the actuation region, can be monitored by the optical sensor system and the distance of the user in the detection region can be captured by the optical sensor. The operating signal is only triggered when the user is at the minimum distance from the motor vehicle and/or from the optical sensor, and is standing in a predetermined position by the motor vehicle.

A further option for increasing the safety of the user can be achieved with a alert signal. Thus, a alert signal that is perceptible by the user alert signal can be emitted before the operating signal is triggered.

If various user intentions can be recognised during monitoring of the actuation region, different user intentions can be assigned to different movement sequences. Thus, for example, stepping into the actuation region can cause the tailgate to open, while a lateral movement of a hand close to the optical sensor has the effect of extending the trailer hitch.

It is conceivable that further steps are carried out before step a). Thus, a detection region outside the motor vehicle can initially be monitored by the optical sensor system and a signal to start of an authentication check can be triggered between an ID transmitter and an access control system if the use is detected in the detection region. Then, an authentication check can be carried out by the authentication system. These steps can be followed by method steps a) to e). The detection region is particularly monitored to be able to determine the proximity of a user. In particular, a passive keyless entry-check can be initiated by monitoring the detection region and triggering a start signal for the authentication check. In this context, the user does not have to actuate the ID transmitter to initiate the authentication check. The additional method steps have the advantage that the authentication check can be initiated and completed and the method steps a) to e) can be carried out by the same optical sensor system and authentication system. Recognition of a user in the detection region can be linked to the fulfilment of certain criteria by the user, such as size, residence duration, movement and/or direction of movement.

The object of the invention is also solved with an assembly module for a motor vehicle, with an optical sensor system that is capable of
a) receiving a signal indicating that an authorised user has been authenticated,
b) monitoring an actuation region outside of the motor vehicle,
c) detecting a distance between an object in the actuation region and an optical sensor of the sensor system,
d) comparing the distance with a specification,
e) providing an operating signal when the specification is satisfied.

The object is also solved with an inventive authentication system having an assembly module, an ID transmitter and an access control system. In particular, the assembly module and/or the authentication system is designed to carry out the method of the invention. For this purpose, in particular the optical sensor system can comprise a monitoring unit having a processor and a memory, with the aid of which the inventive method can be carried out. The inventive method can be stored in the memory. The optical monitoring unit can further be configured to analyse images that have been captured by the optical sensor.

Further, the optical sensor system can include the optical sensor to receive light from the actuation region. The optical sensor records images of the actuation region. For this purpose, the optical sensor can have a lens system and/or an image sensor. The image sensor can be a CMOS sensor and/or a LDPD sensor. The LDPD sensor (Lateral Drift Field Photodetector) is described in document DE 10 2009 020 218 B3. The LDPD sensor is designed so that it can be evaluated particularly quickly.

The optical sensor system can comprise a light module for emitting light. The light serves to create the actuation region. For this purpose, the light module can have a lens system. It can be provided that the light module emits light in the invisible range. In particular, the light can be in the infrared range, particularly near infrared. The light module can have only one light source. Alternatively, the light module can comprise a plurality of light sources. The light sources can be arranged around the optical sensor. Thus, the light sources can be arranged on the left and right of the optical sensor. Alternatively, the light sources can be disposed around the periphery of the optical sensor. The light can be laser light. The light emitted by the light module light can be pulsed.

It can be provided that the optical sensor comprises an infrared filter and/or a polarisation filter. In this way, at least some interference light can be filtered out. The light module can also have a polarisation filter.

The assembly module can have a fastening element, in particular an installation plate for fastening individual elements of the optical sensor system, that is to say the optical sensor, the light module and/or the monitoring unit. Alternatively or additionally, the assembly module can comprise a housing surrounding that at least partially surrounds the optical sensor system. The monitoring unit can be constructed as single unit with the access control system. In particular, in a light module with multiple light sources, the fastening element can be in the form of a spherical segment.

It can be provided that the optical sensor system or the entire assembly module is constructed for arrangement in a vehicle tailgate, for example behind the rear window, in a handle strip, in a badge, in a taillight, behind a reflector, on a bumper and/or in a gap between two components. Alternatively or additionally, the assembly module can be designed to be attached to a vehicle side, in a B-pillar, for example. In particular, the optical sensor system or the entire assembly module can be concealed behind a film that is opaque from the outside but translucent for the light of the optical sensor system. Thus, for example, the bumper on which the optical sensor system is mounted can be painted.

The optical sensor system is preferably arranged on the motor vehicle in such manner that is not exposed to excessive dirt. For example, the optical sensor system can be located in the wiping area of the windshield behind the rear window or on the handle strip. Alternatively or additionally, the assembly module can have a washer nozzle, with which the optical sensor system can be cleaned. In this case the washing nozzle can automatically clean the optical sensor system for example whenever can the windshield wipers of the front and/or rear window(s) is/are operated. The assembly module can comprise a display element, by which visible light can be emitted. In this way, at least a part of the actuation region can be made visible for the user. In particular, a limit area of the actuation region can be made visible on the ground surface.

Additionally or alternatively, the display element can make the actuation time visible for the user. Thus, it is conceivable that the display element is switched on at the beginning of the actuating period. In this context, the display element can assume a first lighting condition. When the actuating period ends, the display element can be switched off. Alternatively, the display element can switch to a second lighting state after the actuating period, which functions as a alert signal. It is also conceivable that the display element can assume a third illumination condition, which signals the removal time. In one of the lighting states, particularly the first lighting state, the display element can emit light of a constant brightness. In the other lighting state or states the brightness can change periodically, for example. In this way, different lighting states can have periods of different lengths.

The intensity of the emitted visible light of the display element can depend on the brightness of the ambient light. The brightness of the ambient light can be detected by a brightness sensor.

The display element is preferably arranged close to the optical sensor and/or the light module. In this way, it is possible to ensure that the area on the ground surface made visible by the display element corresponds sufficiently well with the limit area of the actuation region even on a variable ground surface. In particular, the distance f between the display element and the optical sensor and/or light module is 1 cm≤f≤10 cm, preferably 1 cm≤f≤3 cm.

It is conceivable that a limit area of the actuation region can be of smaller spatial dimensions than a limb, in particular a user's hand or foot. Consequently, only one surface—which should be as flat as possible—such as the sole of a shoe or the palm of a hand has to be positioned in the actuation region for the user to indicate an intended action. This makes it easier to determine a distance between the object and the optical sensor.

It is possible that the image sensor contains pixels. The actuation region is preferably displayed on the image sensor with only a small number of pixels. This allows production and operating costs to be reduced. Thus, the user's body part, particularly a hand or a foot in the actuation region and/or the actuation region can be represented by n pixels, wherein particularly $2 \leq n \leq 10$, preferably n=2. The user's body part is preferably representable with at least the specified number of pixels at each point of the actuation region. The user's body part is displayed with a pixel number greater than 1 to avoid endangering the inventive process with a defective pixel.

In addition, the optical sensor system can be designed to monitor a detection region located outside the motor vehicle before authentication, and if the user is recognised in the detection region to trigger a signal between an ID transmitter and an access control system of the motor vehicle to start an authentication check.

The optical sensor and/or the light module can be able to be used both for monitoring the detection region and for monitoring the actuation region. This means that the same optical sensor and/or light module is used to monitor the detection region and the actuation region. For this purpose, the optical sensor and/or the light module can comprise a rigid lens system. In particular the light module for monitoring the detection region can emit the same light in respect of wavelength and/or light pulse duration as it emits for monitoring the actuation region. Alternatively, the detection region and/or the actuation region can initially be monitored first with light at a longer wavelength than the subsequent check of the distance and/or other requirements that must be met in order to detect a user and/or a user's intention. Thus for example, light having a wavelength of 905 nm can be used first. Light with a wavelength of 800 nm, for example, can be used afterwards.

The assembly module can be constructed such that in a plan view the detection region ends farther from the motor vehicle than the actuation region. This ensures that the actuation region is still located between the user and the vehicle after positive authentication. This means that the user can usually continue his direction of movement to reach the actuation region. In a plan view, the actuation region can be located inside the detection area. Alternatively it can be provided that in a plan view the actuation region is closer to the motor vehicle than the detection region. In particular, the actuation region can adjoin the detection area.

It can be provided that the assembly module and/or the motor vehicle is equipped with at least one means to make it easier for the user to indicate his intention in the actuation region, so that the operating signal is triggered.

For example, the assembly module can emit a alert signal indicating that the actuating period will end shortly. The alert signal can begin for example by changing the lighting state of the display element. The alert signal can correspond to a different lighting state of the display element. For example, the display element can flash at the end of the actuating period. The means corresponds to an appropriate method requirement in the monitoring unit.

It can also be helpful for the user wishing to signal his intention if he is guided to the actuation region. This is particularly the case when the user is unable to see the limit area of the actuation region on the ground surface because he is carrying a large object. For this purpose, the assembly module and/or the motor vehicle can have means by which a signal can be generated that is perceptible for the user, particularly visual, audible or tactile. Thus for example the assembly module can include light elements, e.g., LEDs. The light emitting elements can be arranged such that the light-emitting elements serve as a guide. For example, the light-emitting elements can be aligned such that they produce markings on the ground surface which lead to the actuating region. Additionally or alternatively thereto, the lighting elements can be arranged side by side. The lighting elements can be switched on in an order that shows the user the direction in which he has to move to get to the actuation region. Instead of the lighting elements, this function can also be provided by lighting equipment already arranged side by side in the motor vehicle, for example the light elements of a headlamp, a brake light, turn signal or the like. It is also conceivable to provide the user audible instructions regarding which way he has to move. For this purpose, the assembly module can comprise a loudspeaker. It is also conceivable to transmit a change in direction to the ID transmitter which guides the user with different vibrations. If the user is instructed to change direction, the optical sensor system determines the position of the user and the direction in which he has to move to reach the actuation region, and commands the perceptible to emit the corresponding signal.

It can also be helpful to the user that the position of the actuation region and/or the length of the actuating time is variable. This is particularly useful if a physically handicapped user wishes to indicate his intention. It is also useful if the actuation region is in an awkward location for the user. In such a context the awkward location can be permanent. For example, the actuation region can terminate at a trailer hitch. On the other hand, the awkward location can only be awkward for triggering a one-time operating signal, for example because the actuation region ends in a puddle. In particular, provision can be made for a predefined user action to change the position of the actuation region and/or the length of the actuating time. Thus, for example, the user selects the position of the actuation region and/or length of actuation period by an input in a user menu, e.g., of an on-board control module or an ID transmitter. Alternatively, the predefined user action can be detected by the optical sensor system. In a further alternative, the assembly module can be switched into a learning mode, in which the assembly module learns the changed position of the actuation region and/or the changed length of the actuation region.

It can also be helpful to the user that the actuation region is monitored again to determine a user's intention to trigger an operating signal after a first actuating period has elapsed without a user intention being detected. This is particularly helpful if the user was distracted and has not reached the actuation region in time or has not made a correct gesture. Accordingly, it can be provided that the actuation region is monitored multiple times, particularly two or three times one after the other. The repeated monitoring of the actuation region can be initiated automatically. Alternatively, a predefined user action can be provided to monitor the actuation region for a further actuating duration. For this purpose, a capacitive sensor can be addressed by the user, for example. Alternatively, it can be a predefined user action, which is detected by the optical sensor system.

The predefined user action that is recognised by the optical sensor system and causes a change in the position of actuation region and/or the actuating time and/or a repeated monitoring of the actuation region to detect the user's intention, can for example be the following user actions: a predefined gesture within the actuating and/or detection region, for example a back and forth motion of a body part, failure to remove the body part from the monitoring area if such removal constituted the original gesture, a movement by the user into the detection and/or actuation region and/or out of the detection and/or actuation region. In particular, the body part can be a hand or a foot. In particular, it can be provided that the user exits the detection region for a predetermined time and then returns to the detection region.

If the actuation region is monitored again to detect the user's intention, the display element also indicates this. If the position of the actuation region is changed, the display element indicates this. For this purpose, the display element can comprise multiple lamps, e.g., LEDs. One or more lamps make each make at least part of the actuation region visible. The actuation region with the changed position preferably lies inside the detection region. The corresponding pixels are evaluated depending on which actuation region is monitored.

The invention also includes an authentication system with an ID transmitter, an access control system and an assembly module of the invention. In such case, the assembly module can be constructed as described and/or claimed. The authentication system is able to carry out the authentication check for access authorization. Since the assembly module has triggered the signal for the authentication check, the authentication check can be continued. For example, the access control system can send a wake-up signal to the ID transmitter. Then, the ID transmitter can send an authentication code to the access control system. The access control system can compare the received authentication code with a stored code. In particular, if the two codes match, in other words if the authentication check is successful, a signal can be triggered. Said signal can be an unlocking signal. Alternatively, the signal can be a signal to start monitoring the actuation region. In this case, the unlocking signal is not triggered until at least one further signal, particularly the operating signal and/or a further authentication has taken place. In a further alternative, the operating signal also includes the unlocking signal. The authentication system can also be helpful for determining a minimum distance between the user and the motor vehicle.

Figure 2:
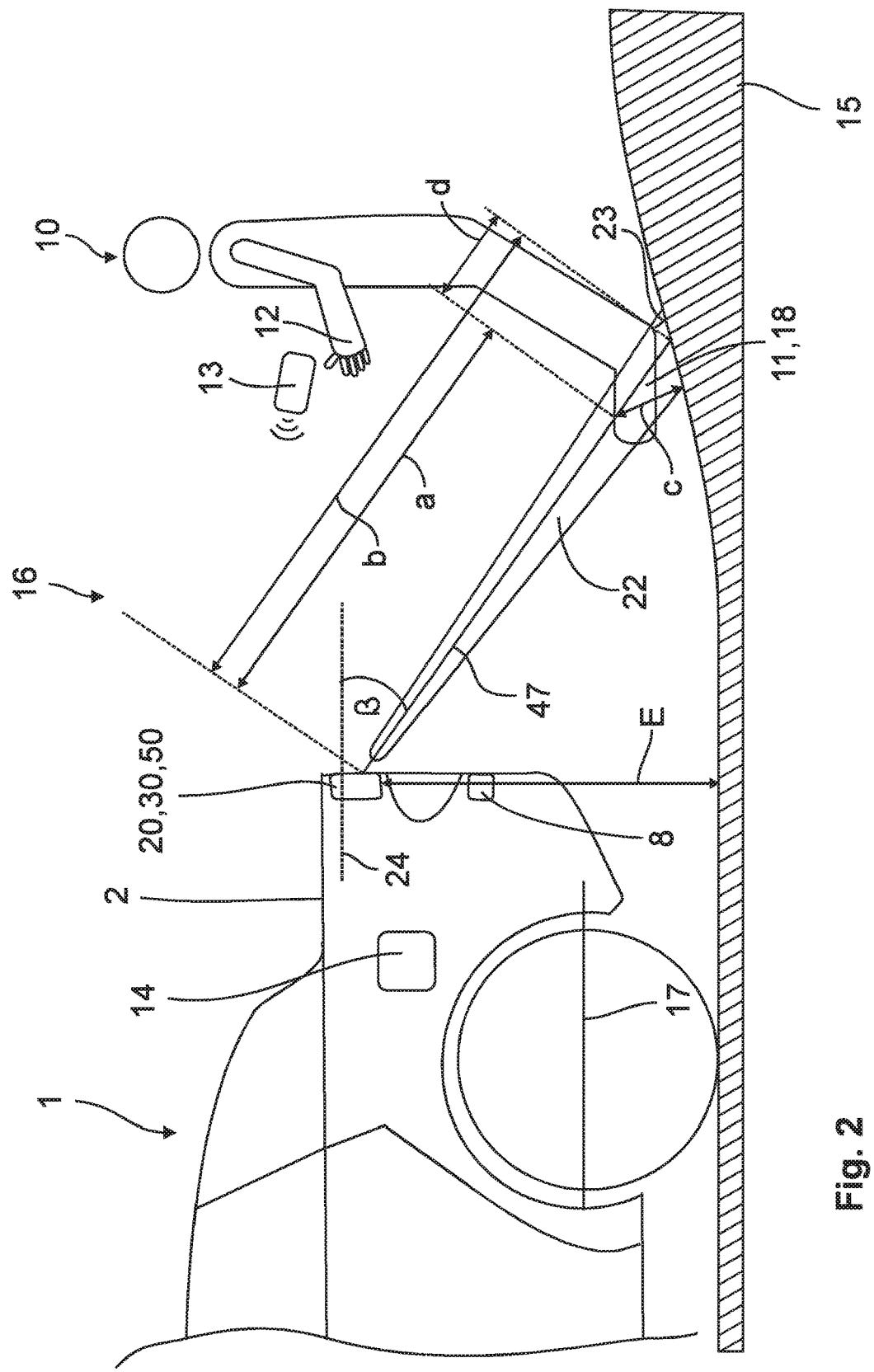
Figure 3:
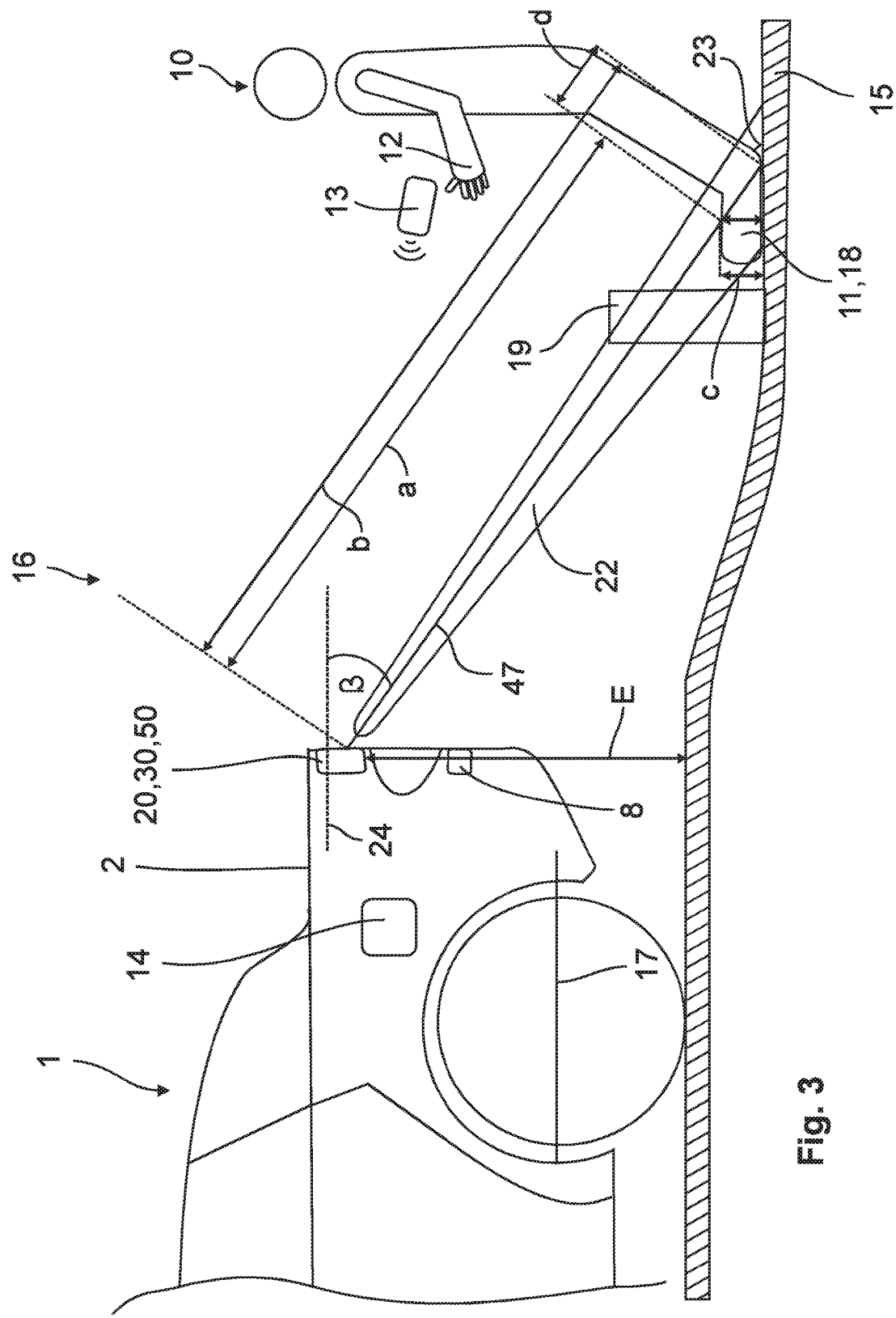
Figure 4:
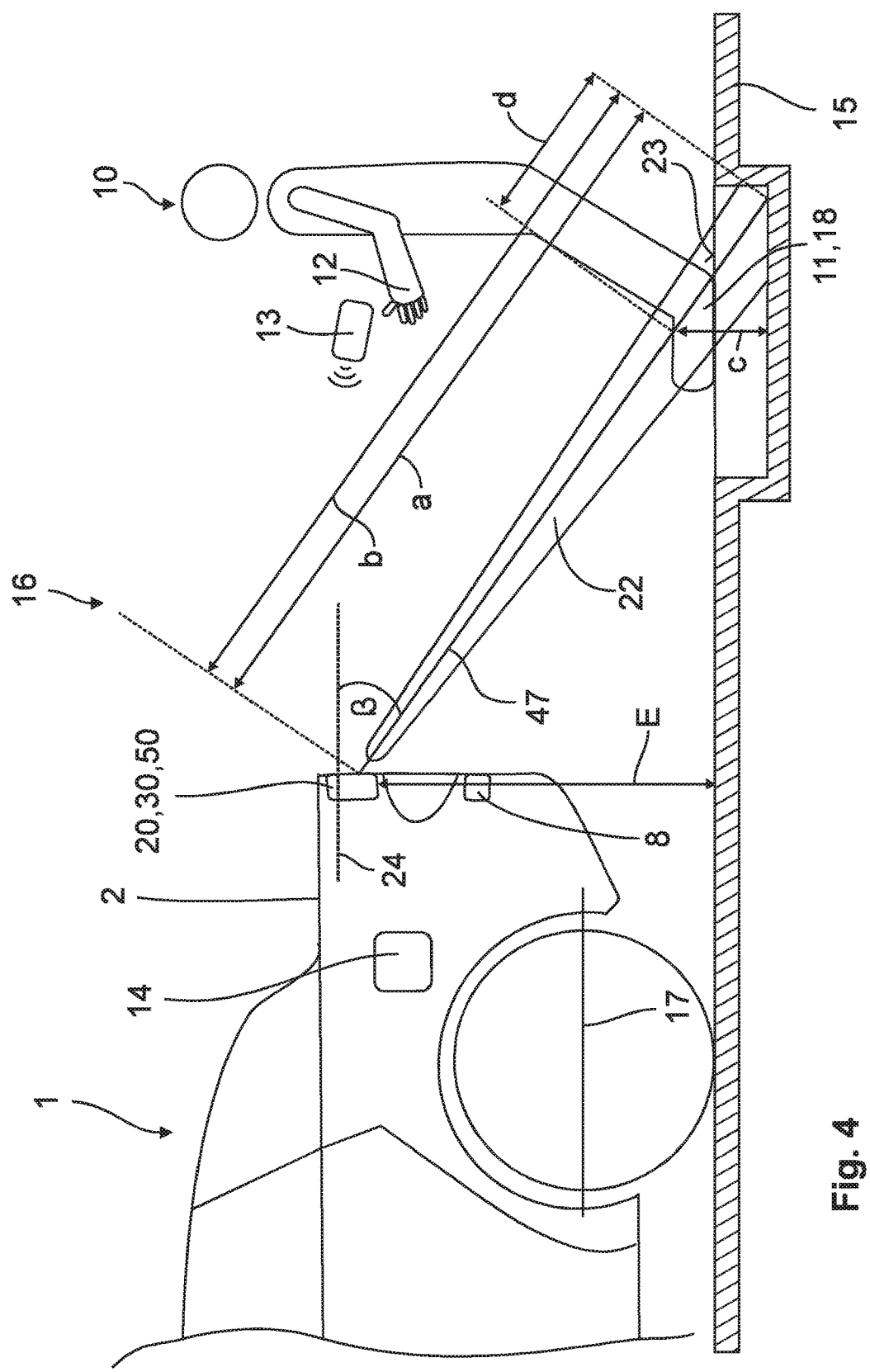
Figure 5:
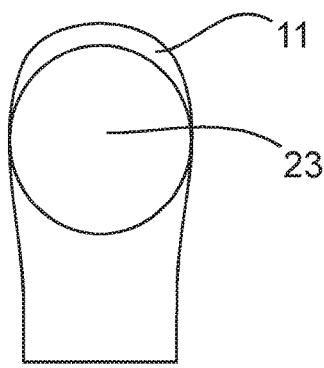
Figure 6:
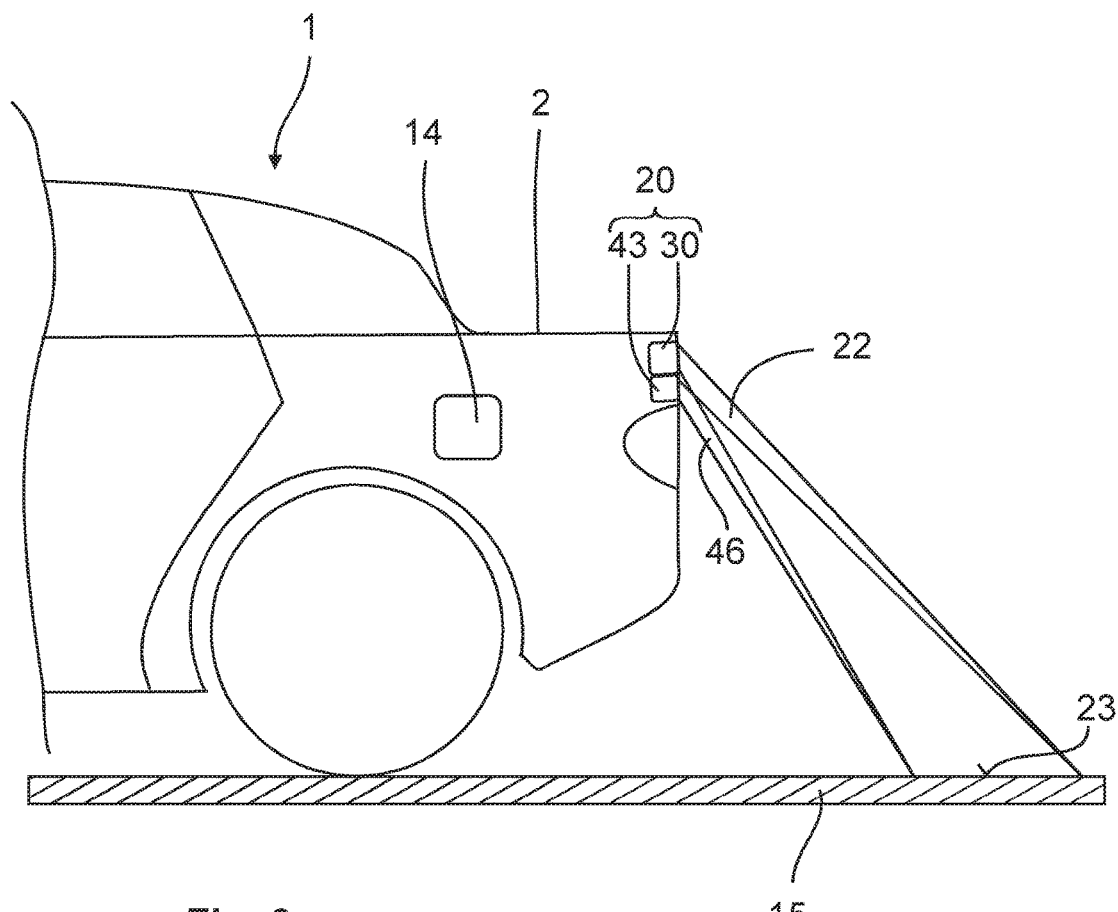
Figure 7:
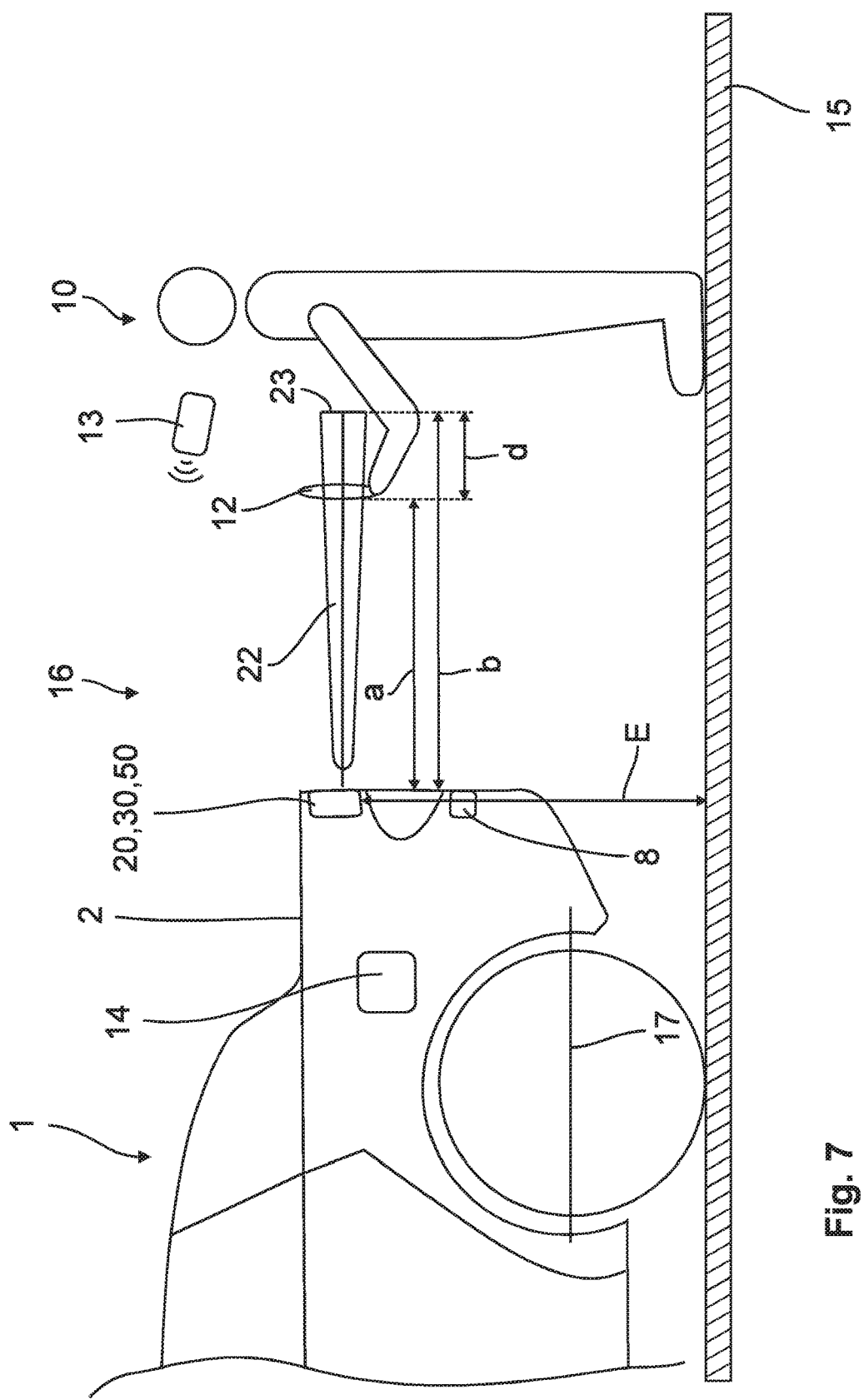
Figure 8:
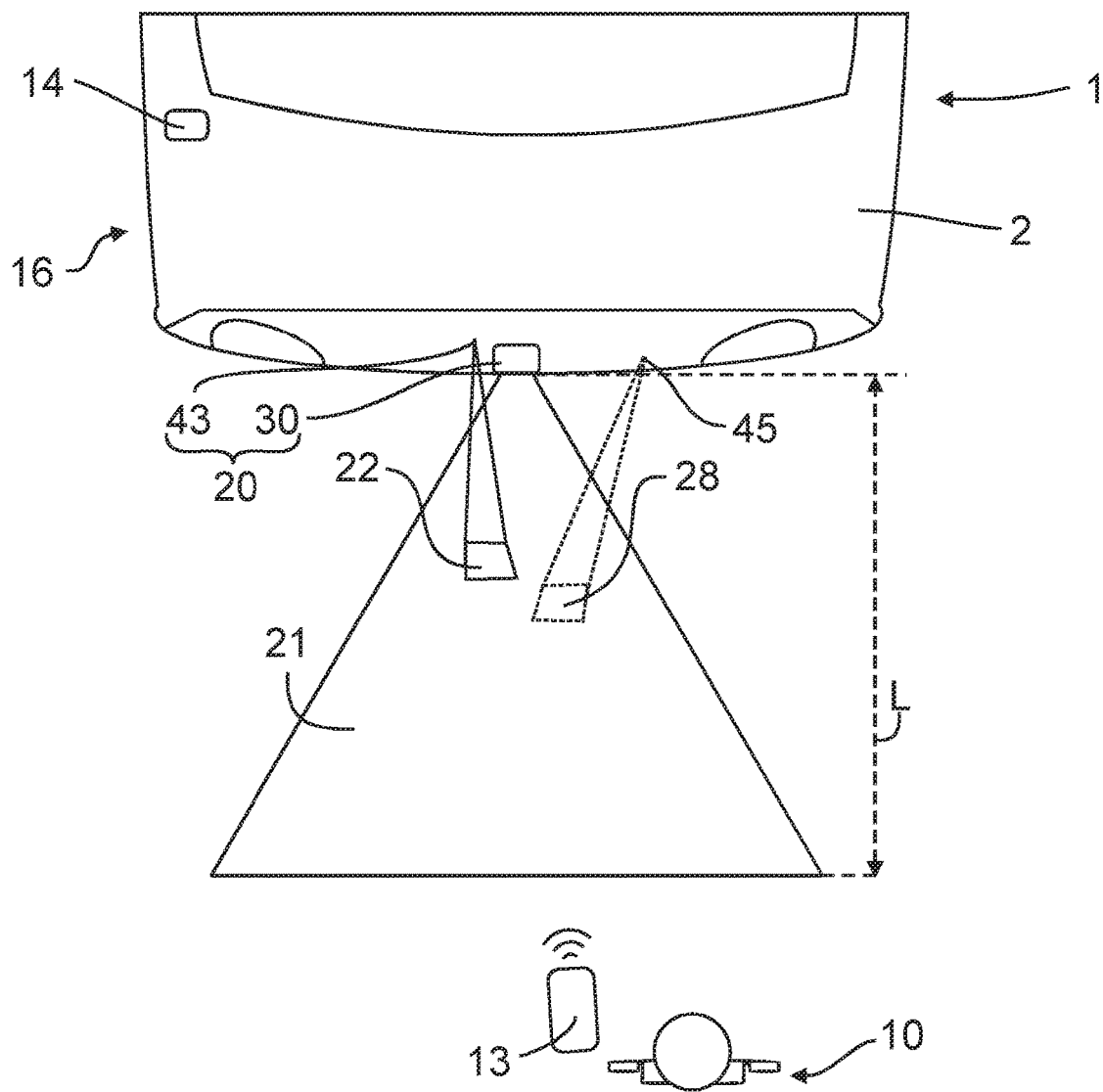
Figure 9:
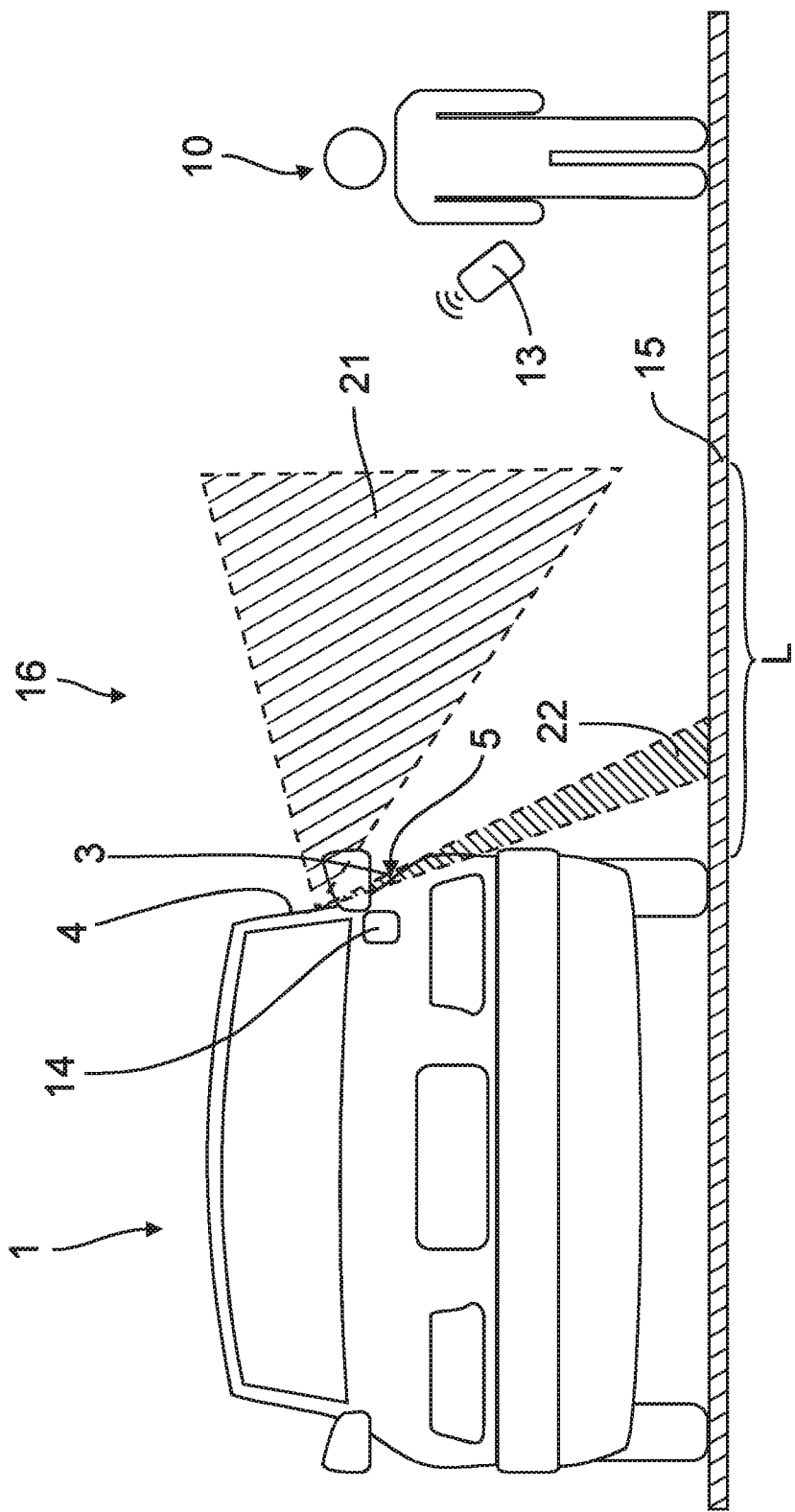
Figure 10:
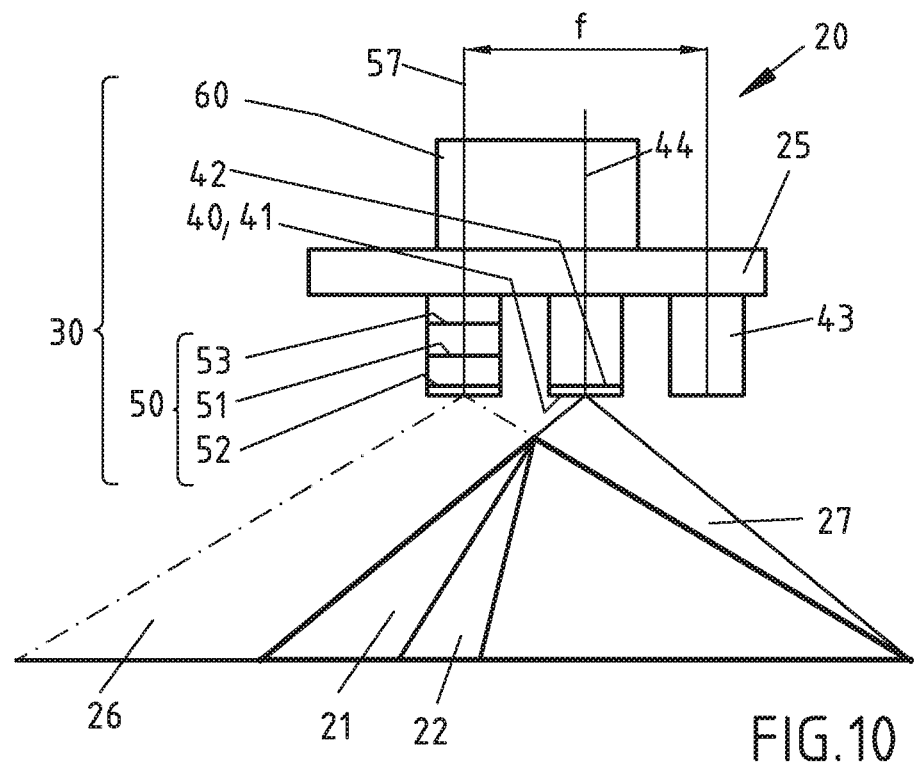
Figure 11:
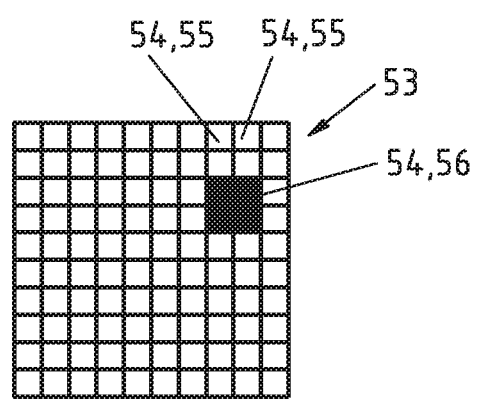
Figures 12, 13:
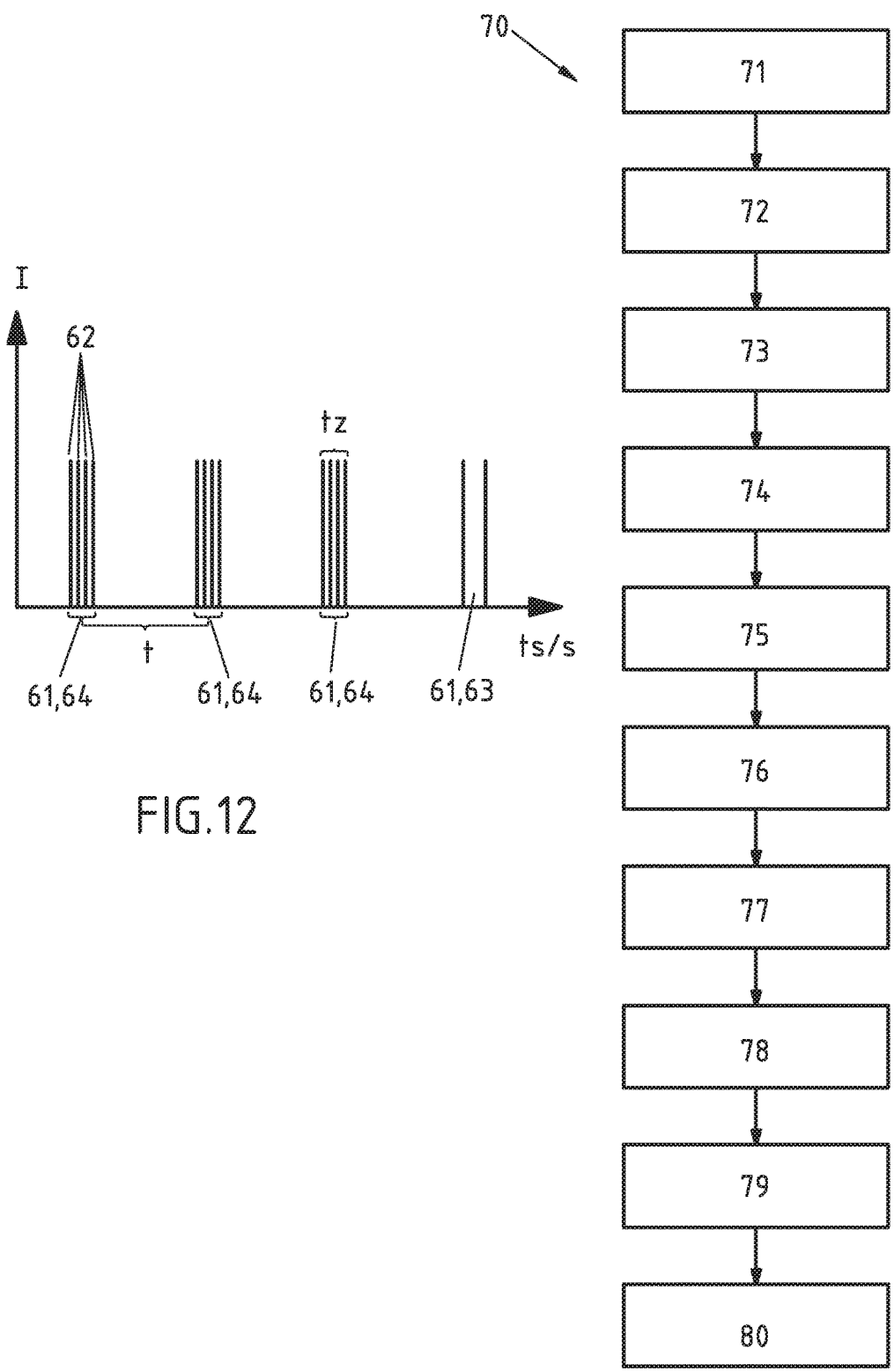

Further measures designed to enhance the invention will become apparent from the following description of the embodiments of the invention, which are represented schematically in the figures. All of the features or advantages specified in the claims, the description or the drawing, including design details, spatial arrangement and method steps can be essential to the invention either individually or in any combination thereof. In the drawing:

FIG. 1 shows a first assembly module according to the invention and a first authentication system according to the invention, FIG. 2 to FIG. 4 show the assembly module and authentication system of FIG. 1, each in a different environment, FIG. 5 is a plan view of a section in FIG. 1, FIG. 6 is a further representation of the assembly module and authentication system of FIG. 1, FIG. 7 is a second assembly module according to the invention and a second authentication system according to the invention, FIG. 8 is a third assembly module according to the invention and a third authentication system according to the invention, FIG. 9 is a fourth assembly module according to the invention and a fourth authentication system according to the invention FIG. 10 is a plan view of the assembly module of FIG. 8, FIG. 11 shows a view of an image sensor of FIG. 10, FIG. 12 is a representation of the radiation intensity over time, and FIG. 13 represents a method according to the invention.

Elements having the same function and mode of operation are designated with the same reference numerals in the figures.

In FIG. 1, an assembly module 20 according to the invention and an authentication system 16 according to the invention have been installed in a motor vehicle 1 according to the invention. In this case, they are shown installed in a rear area of motor vehicle 1 with a tailgate 2. An optical sensor system 30 of assembly module 20 is arranged in the region of the tailgate 2, e.g., in a handle of tailgate 2. The Optical sensor system 30 generates an actuation region 22 outside of motor vehicle 1. After a successful authentication check, the optical sensor system 30 monitors the actuation region 22. In order to start monitoring, optical sensor system 30 receives a signal from an access control system 14 to the effect that an authorised user has been authenticated. For this purpose, access control system 14 previously has sent a wakeup signal to an ID transmitter 13 and ID transmitter 13 has sent an authentication code to access control system 14.

The actuation region 22 extends as an inclined frustum from a position close to optical sensor system 30 to a ground surface 15 on which the vehicle 1 stands. On ground surface 15, the actuation region ends 22 with a limit area 23. The actuation region 22 is at an angle of inclination β to a plane 24 which extends parallel to the ground surface 15 and/or to a plane 17 which extends parallel to a plane connecting the vehicle axles.

If an object 18—in this case a foot 11 of a user 10—is inside the actuation region 22, distance a between the object 18 and an optical sensor 50 of the optical sensor system 30 is measured. For this purpose, a light module 40 of the optical sensor system 30 emits pulsed, infrared light. The light of the light module is reflected by the object 18 and received by the optical sensor 50. FIG. 1 shows a light beam 47 which is reflected by a point on the object 18 or the limit area 23 and received by a pixel 54 in the optical sensor 50. The optical sensor 50 is evaluated by a monitoring unit 60 of the optical sensor system 30. In order to determine distance a, a time-of-flight measurement can be performed. The optical sensor 50, the light module 40 and the monitoring unit 60 are shown in FIG. 10.

Monitoring unit 60 compares detected the distance a with a specification. The monitoring unit 60 only provides an operating signal for opening tailgate 2 if this specification is satisfied. Thus, a condition is created for providing the operating signal, so that not every object 18 in the actuation region 22, triggers the operating signal. Instead, a user intention must be present, holding the object 18 in the actuation region 22 in such manner that the requirement is met and the operating signal is provided. In this way, safety is increased for the user 10. Accordingly, it is provided that the user 10 moves his foot 11 into the actuation region 22 to indicate his intention. When tailgate 2 opens, tailgate 2 moves out of a door lock 8.

FIG. 1 shows various possible ways in which the specification can be satisfied. In a first option for the specification, the distance a can be compared directly compared with a minimum distance stored in the monitoring unit 60. The requirement is only satisfied if the distance a exceeds the minimum distance.

In a second option for the specification, distance b between limit are 23 and the optical sensor 50 can be measured while no object 18 is yet in the actuation region 22. A ratio of the distance a to the distance b is formed, and the value of this ratio is compared with a minimum value stored in the monitoring unit. The specification is only satisfied if the value of the ratio of the distance a to the distance b exceeds the minimum value.

In a third option for the specification, the difference d can be derived from the distances a and b. The difference d describes a distance between a surface 31 of the object 18 facing the optical sensor 50 and the limit area 23. The requirement is only satisfied when the difference d is less than a maximum distance. Alternatively, in a fourth option for the specification, the distance c, describing the distance between a surface facing the optical sensor and the limit area 23 is derived from the distances a and b and the inclination angle β. The requirement is only satisfied if the distance c is less than a maximum value.

Each of the aforementioned requirements describes a minimum distance condition according to which the object is not permitted to come too close to the optical sensor. Accordingly, a user who is too close to the motor vehicle 1 or a dog 19 in actuating area 22 does not trigger the operating signal.

While the first option for the specification does not require the distance b to be measured and hence is particularly simple, the other options for the specification also take an uneven ground surface 15 into account. FIG. 2 shows how the ground surface 15 rises behind the motor vehicle 1. In FIG. 3, the ground surface 15 falls away behind the motor vehicle 1. This situation can be encountered frequently in garage driveways. In FIG. 2, with foot 11 at the same height above the ground surface 15, the first option for satisfying the requirement can no longer be satisfied, whereas the second to fourth options for the specification are fulfilled. On the other hand, foot 11 in FIG. 3 can satisfy all of the options for the requirement. However, unlike the first specification, the second to fourth options for the specification prevent a dog 19 from satisfying the requirement.

Generally, it is assumed that the user 10 should set foot on the limit area 23 to trigger the operating signal. But the minimum distance condition can be formulated such that the user can keep his foot above the limit area 23, to avoid a puddle, for instance, and still satisfy the minimum distance condition, as shown in FIG. 4. Thus for example, a value of 30 cm can be selected for the maximum distance of the distance c. Other corresponding minimum distance conditions are conceivable depending on installation height E and/or inclination angle β.

In FIG. 5, the size of the limit area 23 is shown compared with the foot 11. The limit area 23 has smaller spatial dimensions than the foot 11, so a conclusive average distance a between the foot 11 and the optical sensor 50 can be measured easily.

FIG. 6 shows a display element 43 of the assembly module 20. This display element 43 is also present in the assembly module 20 of FIGS. 1 to 4 but is not shown in FIGS. 1 to 4 to preserve clarity. The display element 43 serves to make the limit area 23 of the actuation region 22 visible to the user 10. To this end, the display element 43 emits visible light 46. The display element 43 is disposed close to the optical sensor system 30. This makes it possible for the portion of the ground surface 15 illuminated by the display element 43 to be sufficiently congruent with the end area 23 even when the ground surface 15 is uneven.

FIG. 7 shows a second Assembly module 20 according to the invention. In this case, the actuation region 22 ends entirely above the ground surface 15. It is provided that the authorized user 10 reaches into the actuation region 22 with his hand 12 so that his hand 12 fulfils the minimum distance condition and the operating signal is provided. In this scenario, the first to third options for a minimum distance condition are conceivable. The limit area of the actuation region 22 is given by the decreasing intensity of the light emitted by the light module 40. The display element 43 does not make the limit area 23 of the actuation region 22 visible, but by emitting visible light it provides a visible indication of an actuating period $t_B$, during which an object in the actuation region 22 that satisfies the minimum distance condition can trigger the operating signal.

FIG. 8 shows a third exemplary embodiment of an assembly module 20 according to the invention and an authentication system 16 according to the invention. The statements made regarding FIGS. 1 to 6 also apply with respect to the arrangement of the assembly module 20 in the rear of the vehicle and with respect to the function of the actuation region 22. The optical sensor system 30 of the assembly module 20 shown in FIG. 8 is able to monitor a detection region 21. Detection region 21 is monitored from the time motor vehicle 1 is parked until authentication is completed successfully. In this context, a user 10 can be detected in the detection region 21 by the optical sensor system 30. If a user 10 is recognised, a signal to start an authentication check is triggered. The authentication check is carried out independently by the access control system 14 and the ID transmitter 13. In this case, user 10 does not have to operate the ID transmitter 13, and consequently this is a passive entry inspection. Upon successful authentication, the optical sensor system 30 receives a signal to the effect that the user 10 has been successfully authenticated. This causes the optical sensor system 30 to monitor the actuation region 22.

The detection region has length L. The actuation region 22 has smaller spatial dimensions than the detection region 21 and is located inside the detection area 21. The actuation region 22 terminates closer to vehicle 1 than the detection area 21. Thus, the user 10 can continue moving in the same direction, wherein user 10 is first authenticated. Then, the user 10 can move his foot 11 into the actuation region 22.

It can be that the actuation region 22 is the only actuation region. Optionally, and therefore shown in dashed lines in FIG. 1, a second actuation region 28 is also represented. In this case, an object 18 must satisfy the minimum distance condition in both actuation regions 22, 28 within a predefined actuating time $t_B$ in order to the operating signal to be provided. A second display element 45 of the assembly module 20 serves to render the second actuation region 28 visible.

FIG. 9 shows a fourth embodiment, illustrating how the assembly module 20 according to the invention and authentication system 16 according to the invention are used. In FIG. 9, the assembly module 20 is disposed in a B-pillar 4 in the side of a motor vehicle. An object approaching side door 3 of the motor vehicle 1 is monitored through the detection region 21. The operating signal can be used to the open side door 3. The actuation region 22 terminates closer to the motor vehicle 1 than the detection region 21. The actuation region 22 is outside of the detection region 21. The actuation region 22 in the embodiment of FIG. 9 includes the area of the door handle 5. In the actuation region 22, particularly a hand 12 of the user 10, located near door handle 5 satisfies the minimum distance condition.

In FIG. 10, the third embodiment of an assembly module 20 according to the invention is shown in a plan view. The assembly module 20 has an installation plate 25 as a fastening element, an optical sensor system 30 and a display element 43. The optical sensor system 30 includes a light module 40, which in FIG. 10 is in the form of a single light source 41. The light source 41 emits infrared light, creating a transmission area 27. The shape and form of the transmission area 27 is created using a lens system 42 of light source 41, which is shown only schematically. The optical sensor system 30 also includes an optical sensor 50, which can receive light from a receiving area 26. The shape and form of the receiving area 26 is defined by a schematically shown lens system 51 of the optical sensor 50. The detection region 21, represented with a thick line, is created by the superimposing detection area 26 on the transmission area 27. The optical sensor 50 includes an infrared filter 52 to filter out light at other wavelengths. The optical sensor further comprises an image sensor 53, on which the image is reproduced. A monitoring unit 60 is used to evaluate the optical sensor 50. The optical sensor 50, the light module 40 and the monitoring unit 60 are fastened to the installation plate 25. The lens systems 42, 51 are rigid.

The actuation region 22 lies inside the detection area 21. This corresponds to the third embodiment. Alternatively, the detection region 21 and the actuation region 22 can be formed separately in the area in which the transmission and receiving areas are superimposed, so that the detection and the actuation regions 21, 22 are arranged as in FIG. 9. There is a small distance f between the display element 43 and the optical sensor 50.

FIG. 11 shows a plan view of an image sensor 53 of an assembly module 20 according to the invention, which has a total number of pixels 54. Since the detection region 21 is also monitored by the same image sensor 53, only a few pixels 54, in particular between two and ten pixels 54, are used to map the actuating region 22 onto the image sensor 53. In FIG. 11, four pixels 54 map the actuating region 22 for exemplary purposes. While actuation region 22 is being monitored, only the pixels 56 assigned to the actuation region 22 are evaluated. The remaining pixels correspond to unevaluated pixels 55.

FIG. 12 shows a plot of the light intensity I against time ts. As shown in FIG. 12, an image 61 is created with the aid of the image sensor 53 after each time period t, wherein in FIG. 12 a time interval $t_z$ represents the time required to create each image 61. The image can be a recognition image 64 or a comparison image 63. Recognition image 64 has been captured using light pulses 62 from light module 40. A large number of light pulses 62 are necessary to produce a recognition image 64. The light pulses 62 are emitted by the light module 40 at a predetermined pulse frequency. The light from the light pulses 62 of an image 61 received by the image sensor 53 is processed integratively or cumulatively to generate recognition image 64. In order to carry out a distance detection, the optical sensor system 30 defines time interval tz at which the light pulses 62 generate a recognition image 64. The distance between user 10 and the optical sensor 50 is determined as a function of the intensity of light pulses 62 in time interval tz. In comparison image 63, an image 61 is taken without light pulses 62 from light module 40 reaching the image sensor 53. To achieve this, the light module 40 emits no light.

A method according to the invention is represented in FIG. 13. Initially, in a first step 71 the optical sensor system 30 monitors the detection region 21. If a user 10 is in the detection region 21 and if user 10 satisfies the predefined criteria, the user 10 is recognised. In this case, in a second step 72 a signal for the authentication check is triggered. In a third step 73, the authentication check is performed. In this context, the signal emitted in step 72 causes the access control system 14 to send a wake-up signal to the ID transmitter 13. Then, the ID transmitter 13 transmits an authentication code to the access control system 14. The access control system 14 compares the authentication code with a stored code. If the two codes match, the authentication is successful and an unlocking signal is triggered. This can be an unlocking signal for all doors of the motor vehicle 1, or it can simply be a signal to unlock the tailgate 2 or the side door 3.

After successful authentication, in a fourth step 74 a signal to the effect that the user 10 has been authenticated is received by the optical sensor system 30. In a fifth step 75, monitoring of the actuation region 22 begins. For this, an actuating period is started. The display element 43 also starts to emit visible light in a first light emitting state, so that the limit area 23 of the actuation region 22 is made visible to the user 10. At the same time, the light module 40 emits pulsed infrared light to make the distance measurements. The optical sensor 50 receives the light from the light module 40, whereby a recognition image 64 is formed. The comparison images 63 are also captured and evaluated. The monitoring unit 60 evaluates the images 61 obtained. In this process, the distance b can first be collected and stored. If an object 18 is within the actuation region 22, in a step 76 the distance a between the object 18 and the optical sensor 50 is measured. At least one minimum distance condition is checked in a step 77 by the monitoring unit 60. Thus for example, the distance a can be compared with the minimum distance stored in the monitoring unit, and/or the difference between the distances b and a can be compared with a maximum distance. Only if the minimum distance condition is fulfilled, in a next step 78 the display element 43 is switched to a second lighting condition, in which the brightness of the light from display element 43 is changed periodically, in other words it flashes. At the same time a removal time $t_E$ is started. If the object 18 is removed from the actuation region 22 within removal time $t_E$, in a step 79 the monitoring of the actuation region 22 is terminated and display element 43 is placed in a third illumination state, in which the display element 43 provides a alert signal to the user 10. Then, after a fixed, predetermined time interval, in a step 80 the operating signal for opening tailgate 2 is provided and the display element 43 is switched off.

If an object 18 is not detected inside the actuation region 22 within the actuating time $t_B$ and/or if the minimum distance condition is not met within the actuating duration $t_B$ and/or if the object 18 is not removed from the actuation region 22 within removal time $t_E$, monitoring of the actuation region 22 is ended after the actuating time $t_B$ elapses. This is indicated by the fact that the display element 43 stops emitting light.

In particular, the steps 71 to 73 and 78 to 79 are optional. In particular, the operating signals can alternatively be provided immediately after step 77. The step 74 corresponds to the method step a, the steps 75 to 78 correspond to the method step b, the step 76 corresponds to the method step c, the step 77 corresponds to the method step d and the step 80 includes the method step e.

LIST OF REFERENCE SIGNS

1 Motor vehicle
2 Tailgate (moving part)
3 Side door (moving part)
4 B-pillar
5 Door handle
8 Door lock
10 User 11 Foot
12 Hand
13 ID transmitter
14 Access control system
15 Ground surface
16 Authentication system
17 Plane
18 Object
19 Dog
20 Assembly module
21 Detection region
22 First actuation region
23 Limit area
24 Plane
25 Fastening element
26 Receiving area
27 Transmission area
28 Second actuation region
30 Optical sensor system
31 Surface of 11
40 Light module
41 Light source of 30
42 Lens system for 30
43 First display element
44 Optical axis of 41
45 Second display element
46 Light from 43
47 Reflected light beam
50 Optical sensor
51 Lens system of 50
52 IR filter
53 Image sensor
54 Pixel
55 Unevaluated pixel
56 Evaluated pixel
57 Optical axis of 50
60 Monitoring unit
61 Image
62 Light pulse
63 Comparison image
64 Recognition image
70 Method
71 Method step
72 Method step
73 Method step
74 Method step
75 Method step
76 Method step
77 Method step
78 Method step
79 Method step
80 Method step
β Inclination angle
E installation height
L Length of 21
a Distance from 18 to 50
b Distance from 23 to 50
c Distance from 31 to 23
d Distance from 31 to 23
f Distance from 43 to 50

The invention claimed is:

1. A method for providing an operating signal for a motor vehicle comprising the steps of:
    a) receiving a signal indicating that an authorized user has been authenticated,
    b) monitoring an actuation region outside the motor vehicle via an optical sensor system,
    c) detecting a distance between an object in the actuation region and an optical sensor via the optical sensor system,
    d) comparing the distance with a specification via the optical sensor system, and
    e) providing an operating signal if the specification is satisfied,
    wherein
    the monitoring of the actuation region is triggered in case of a successful authentication check,
    the operating signal is a signal for at least unlocking, locking, opening or closing a moving part of the motor vehicle, and
    the specification corresponds to a minimum value for a ratio between the distance between the object and the optical sensor and a distance between a limit area of the actuation region and the optical sensor, wherein the limit area of the actuation region is located on a ground surface on which the motor vehicle is standing.

2. The method according to claim 1,
    wherein the moving part is particularly a tailgate or at least a side door or a sliding door.

3. The method according to claim 1,
    wherein
    the optical sensor system emits a plurality of light pulses in succession, a time interval for receiving the light pulses is predetermined by the optical sensor system, and the distance is detected in step on the basis of the intensity of the light pulses received in the time interval.

4. The method according to claim 1,
    wherein
    in step b) recognition images are created using reflected light from a light module, and comparison images that have been created with interference light, without the reflected light from the light module, are captured and evaluated in such manner that a modified recognition image is generated, from which the interference light is removed.

5. The method according to claim 1,
    wherein
    the actuation region is only monitored for a predetermined actuating period.

6. The method according to claim 1,
    wherein
    the operating signal is only provided upon fulfilment of at least one further specification, particularly at least the size of the object, a residence duration of the object in the actuation region, a defined movement sequence of the object in the actuation region or removal of the object from the actuation region within a predetermined removal time.

7. The method according to claim 1,
    wherein
    an alert signal perceptible to the user is emitted before the operating signal is provided.

8. An assembly module for a motor vehicle, with an optical sensor system that is capable of:
    a) receiving a signal indicating that an authorized user has been authenticated,
    b) monitoring an actuation region outside the motor vehicle,
    c) detecting a distance between an object in the actuation region and an optical sensor of the sensor system,
    d) comparing the distance with a specification, and
    e) providing an operating signal if the specification is satisfied, wherein optical sensor system is configured to trigger the monitoring of the actuation region in case of a successful authentication check, the operating signal is a signal for at least unlocking, locking, opening or closing a moving part of the motor vehicle, and the specification corresponds to a minimum value for a ratio between the distance between the object and the optical sensor and a distance between a limit area of the actuation region and the optical sensor, wherein the limit area of the actuation region is located on a ground surface on which the motor vehicle is standing.

9. The assembly module according to claim 8,
wherein
a method for providing an operating signal for a motor vehicle comprising the steps of:
a) receiving a signal indicating that an authorized user has been authenticated,
b) monitoring an actuation region outside the motor vehicle via an optical sensor system,
c) detecting a distance between an object in the actuation region and an optical sensor via the optical sensor system,
d) comparing the distance with a specification via the optical sensor system, and
e) providing an operating signal if the specification is satisfied,
can be carried out by the assembly module.

10. The assembly module according to claim 8,
wherein
the optical sensor system comprises a monitoring unit which is designed to evaluate images captured by the optical sensor.

11. The assembly module according to claim 8,
wherein
the optical sensor system comprises the optical sensor to receive light from the actuation region, and the optical sensor system comprises a light module with at least one light source for emitting light, wherein in particular the light source is designed to emit light in the invisible range.

12. The assembly module according to claim 8,
wherein
the assembly module has a display element via which visible light can be emitted to render at least a part of at least the actuation region or an actuating duration visible to the user.

13. The assembly module according to claim 12,
wherein
the display element is designed to render a limit area of the actuation region visible on a ground surface on which the motor vehicle is standing.

14. An assembly module for a motor vehicle, with an optical sensor system that is capable of:
a) receiving a signal indicating that an authorized user has been authenticated,
b) monitoring an actuation region outside the motor vehicle,
c) detecting a distance between an object in the actuation region and an optical sensor of the sensor system,
d) comparing the distance with a specification, and
e) providing an operating signal if the specification is satisfied,
wherein
the assembly module has a display element via which visible light can be emitted to render at least a part of at least the actuation region or an actuating duration visible to the user,
the display element is designed to render a limit area of the actuation region visible on a ground surface on which the motor vehicle is standing,
the limit area of the actuation region has smaller spatial dimensions than a body part, particularly a hand or foot of the user, and
the specification corresponds to a minimum value for a ratio between the distance between the object and the optical sensor and a distance between the limit area of the actuation region and the optical sensor.

15. The assembly module according to claim 8,
wherein
the optical sensor comprises an image sensor, wherein a body part of the user in at least the actuation region or the actuation region can be represented with n pixels in which particularly, $2 \leq n \leq 10$.

16. The assembly module according to claim 8,
wherein
the optical system is designed to monitor a detection region outside of the motor vehicle before authentication, and in the event that a user is recognized in the detection region to trigger a signal for starting an authentication check between a ID transmitter and an access control of the motor vehicle.

17. The assembly module according to claim 16,
wherein
at least the optical sensor or a light module are designed to be used both to monitor the detection region and to monitor the actuation region.

18. The assembly module according to claim 17,
wherein
at least the optical sensor or the light module include(s) a rigid lens system.

19. An authentication system with an access control system, an ID transmitter and an assembly module for a motor vehicle, with an optical sensor system that is capable of:
a) receiving a signal indicating that an authorized user has been authenticated,
b) monitoring an actuation region outside the motor vehicle,
c) detecting a distance between an object in the actuation region and an optical sensor of the sensor system,
d) comparing the distance with a specification, and
e) providing an operating signal if the specification is satisfied,
wherein the specification corresponds to a minimum value for a ratio between the distance between the object and the optical sensor and a distance between a limit area of the actuation region and the optical sensor, wherein the limit area of the actuation region is located on a ground surface on which the motor vehicle is standing.

20. The assembly module according to claim 15, wherein n=2.

* * * * *